United States Patent
Reitmeier

[19]

[11] Patent Number: 6,115,080
[45] Date of Patent: Sep. 5, 2000

[54] CHANNEL SELECTION METHODOLOGY IN AN ATSC/NTSC TELEVISION RECEIVER

[75] Inventor: Glenn Arthur Reitmeier, Yardley, Pa.

[73] Assignee: Sarnoff Corporation, Princeton, N.J.

[21] Appl. No.: 09/092,776

[22] Filed: Jun. 5, 1998

[51] Int. Cl.[7] .............................. H04N 5/445; H04N 5/50
[52] U.S. Cl. .................. 348/731; 348/589; 348/565; 348/569; 348/705; 348/564
[58] Field of Search .................................. 348/584, 588, 348/589, 598, 599, 600, 564, 565, 567, 569, 906, 568, 731, 732, 733, 705, 706; H04N 5/50, 5/268, 5/445

[56] References Cited

U.S. PATENT DOCUMENTS 5,453,796  9/1995  Duffield et al. .
5,790,202  8/1998  Kummer .................................. 348/553

FOREIGN PATENT DOCUMENTS 0 536 901  4/1993  European Pat. Off. .
0 725 538  8/1996  European Pat. Off. .
WO 94 13107  6/1994  WIPO .

OTHER PUBLICATIONS

PCT International Search Report PCT/US99/12306 corresponding to US 09/092,776.

Primary Examiner—Sherrie Hsia
Attorney, Agent, or Firm—William J. Burke

[57] ABSTRACT

The invention comprises a method of selecting for further processing (e.g., display) a desired television channel suitable for use in a television receiver capable of receiving both analog (e.g., NTSC, PAL or SECAM) and digital (e.g., ATSC or DTB) television signals. The method provides appropriate user feedback such that channel selection is effected in a relatively rapid manner utilizing one of a direct channel selection, an electronic program guide selection process, a picture in picture montage selection process or a combination thereof. One embodiment of the invention implements a method for masking the channel selection latency period inherent in ATSC-like television systems.

20 Claims, 6 Drawing Sheets

CHANNEL SELECTION METHODOLOGY IN AN ATSC/NTSC TELEVISION RECEIVER

The invention relates to television receivers generally, and more particularly, television receivers capable of receiving both analog and digitally encoded television signals.

BACKGROUND OF THE DISCLOSURE

Consumers have become accustomed to the rapid channel change capabilities of present-day NTSC (National Television Standards Committee) television receivers. Such television receivers change channels by changing a tuner frequency (i.e., tuning), and acquiring a television signal modulated onto the tuner frequency (i.e., synchronizing). The predominant time delay in an NTSC television receiver channel change operation is the time required to change the tuner frequency. Acquiring picture synchronization is extremely rapid, since horizontal and vertical synchronization information occurs frequently (i.e., 63 microseconds and 33 milliseconds, respectively) in an NTSC television signal.

In the relatively near future, the type of television receiver used by consumers will be radically changed. Specifically, future television receivers are expected to be implemented substantially in accordance with the transmission standards established by the Advanced Television Standards Committee (ATSC). A similar standard in the European Digital Video Broadcasting (DVB) standard. A compressed digital video system is described in the ATSC digital television standard document A/53, incorporated herein by reference. Moreover, the Moving Pictures Experts Group (MPEG) has promulgated several standards relating to digital data delivery systems. The first, known as MPEG-1, refers to ISO/IEC standards 11172 and is incorporated herein by reference. The second, known as MPEG-2, refers to ISO/IEC standards 13818 and is incorporated herein by reference.

Unfortunately, changing channels in a television receiver conforming to the ATSC-like standards is inherently a much slower process than the above-described NTSC process. Specifically, an ATSC television receiver must sequentially perform many steps to acquire a television signal and produce a series of images from that signal. First, a tuner frequency must be adjusted to a frequency allocated to the channel of interest. Second, the VSB or QAM demodulator must perform a carrier recovery process to begin to produce valid output data. Third, the vestigial sideband (VSB) or quadrature amplitude modulated (QAM) demodulator must acquire data field and data segment synchronization information. Fourth, a transport decoder must acquire packet synchronization information, and then decode so-called program map tables (PMT) and program access tables (PAT) to deliver video and audio data to the respective decoders. Fifth, video rate buffers must be loaded with the video data corresponding to the channel of interest. Sixth, the video decoder begins to perform variable length decoding (VLD), converting the bit stream into instructions and data suitable for use in subsequent decoding steps. Seventh, a video decoder must wait for the occurrence of an intra-coded frame (I-frame) in the data stream before picture decompression can begin. The rate of I-frame occurrence is controlled by a television broadcaster's compression encoder, though the rate will likely be one I-frame per each 12 frame group of pictures (GOP) transmitted. Thus, the average latency for video acquisition alone will be on the order of six frames (approximately 200 milliseconds) and the worst case latency for video acquisition alone will be on the order of 12 frames (approximately 400 milliseconds). It is believed that such a high latency channel change operation will be unacceptable to consumers.

Therefore, it is seen to be desirable to provide a method and apparatus for providing a rapid, or seemingly rapid, channel change or channel acquisition capability in a ATSC television receiver.

SUMMARY OF THE INVENTION

The invention comprises a method of selecting for further processing (e.g., display) a desired television channel suitable for use in a television receiver capable of receiving both analog (e.g., NTSC, PAL or SECAM) and digital (e.g., ATSC or DTB) television signals. The method provides appropriate user feedback such that channel selection is effected in a relatively rapid manner utilizing one of a direct channel selection, an electronic program guide selection process, a picture in picture montage selection process or a combination thereof. One embodiment of the invention implements a method for masking the channel selection latency period inherent in ATSC-like television systems.

Specifically, a method according to the invention for selecting for further processing one of a plurality of available television channels comprising the steps of: adapting, in response to a user input indicative of at least a desired physical channel, a physical channel selection apparatus; and in the case of the physical channel selection apparatus providing a first type of television channel: selecting the television channel provided by the physical channel selection apparatus; while in the case of the physical channel selection apparatus providing a second type of television channel: providing, to the user, channel selection information comprising at least one of electronic program guide information and image information associated with one or more logical channels; and selecting, in response to a user input indicative of a desired logical channel, the desired logical channel.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
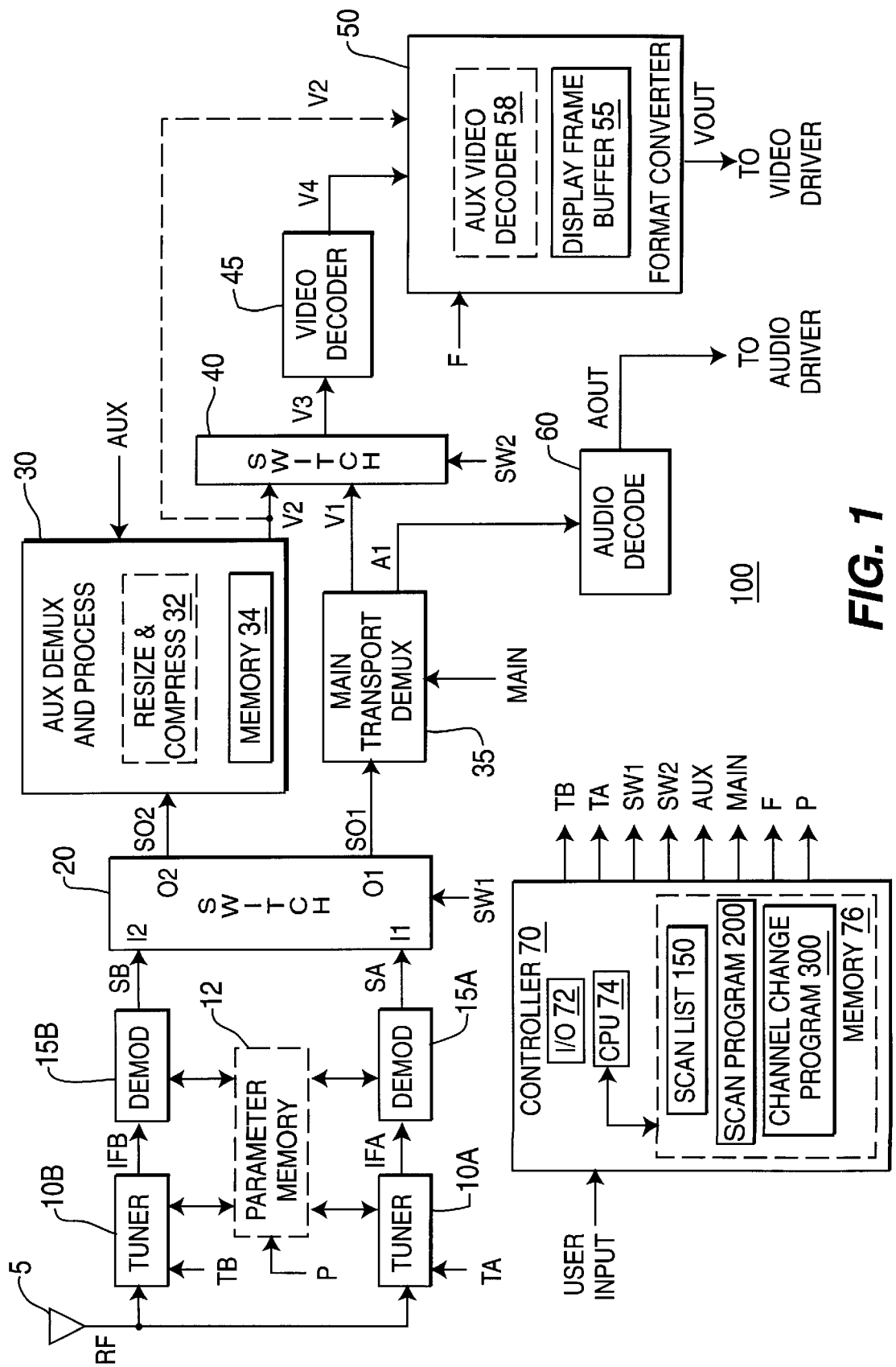
FIG. 1 depicts a high-level block diagram of an ATSC receiver according to the invention.

The invention will be described within the context of an ATSC television receiver. However, it will be apparent to those skilled in the art that the invention is applicable to any receiver of segmented information streams, such as DVB, MPEG-1, MPEG-2 and other information streams. FIG. 1 shows high-level block diagram of an ATSC receiver 100 according to the invention. The receiver 100 includes a controller 70 comprising a central processing unit (CPU) 74 that is coupled to an input/output (I/O) port 72 and a memory unit 76. The controller utilizes the I/O port 72 to receive user input commands from, e.g., a remote control unit (not shown) and provide a plurality of control signals to control various portions of the receiver 100. The user input commands include standard television receiver commands, such as change channel, change volume, adjust picture and the like. The memory unit 76 is used to store, inter alia, programs and associated data structures used by the CPU 74, including a channel scanning program 200, a channel changing program 300 and an associated scan list 150.

The channel scanning program 200 will be described in more detail below with respect to FIG. 2. Briefly, when running the channel scanning program 200, the controller 70 causes an auxiliary processing portion of the receiver to repeatedly tune, demodulate and decode some or all of a group of 4 channels identified in the scan list 150. At least a portion (e.g., a video I-frame) of each decoded channel is stored for subsequent retrieval.

The channel changing program 300 will be described in more detail below with respect to FIG. 3. Briefly, when running the channel changing program 300, the controller 70 causes a main processing portion of the receiver to tune, demodulate and decode a new channel in response to a user input (e.g., a channel change request). If the new channel is one of the channels included in the scan list 150, then the controller 70 causes the auxiliary processing portion to retrieve the most recently stored I-frame associated with the new channel. The retrieved I-frame is then decoded and displayed. Contemporaneously, the audio portion of the new channel is decoded and sent to an audio output device. This approach provides the illusion of rapid responsiveness, in spite of the real latency that is inherent in an ATSC television receiver channel change.

Referring to FIG. 1, an RF source 5 (illustratively, an antenna or cable television distribution network), provides a radio frequency (RF) signal comprising a plurality of television signals modulated according to a vestigial sideband (VSB), quadrature amplitude modulation (QAM) or other suitable modulation scheme. The provided RF television signals are coupled to a first tuner 10A and a second tuner 10B. First tuner 10A, in response to a control signal TA, downconverts a desired television signal to produce a first intermediate frequency (IF) television signal IFA. A first demodulator 15A, illustratively a VSB or QAM demodulator, demodulates the first IF television signal IFA to produce a first MPEG-like system stream SA. The first tuner 10A and first demodulator 15A form a first tuner/demodulator pair.

A second tuner 10B, in response to a control signal TB, downconverts a desired television signal to produce a second intermediate frequency (IF) television signal IFB. A second demodulator 15B, illustratively a VSB demodulator, demodulates the second IF television signal IFB to produce a second MPEG-like system stream SB. The second tuner 10B and second demodulator 15B form a second tuner/demodulator pair. The first and second tuner/demodulator pairs operate in substantially the same manner.

The first and second system streams SA, SB are coupled to respective first I1 and second I2 inputs of a first switch 20. First switch 20, in response to a control signal SW1 from the controller 70, couples one of the first and second system streams SA, SB to a first output O1 as a first output stream SO1. First switch 20, in response to the control signal SW1 from the controller 70, couples one of the first and second system streams SA, SB to a second output O2 as a second output stream SO2. The first switch 20 may couple either input stream SA. SB to either (or both) outputs O1, O2.

The first and second system streams SA, SB comprise MPEG-like system streams that may contain one or more MPEG-like program streams. The MPEG-like program streams are analogous to NTSC channels, in that each program stream typically transports the video and audio portions of a single program, such as a movie or other audio-visual program. Each program stream comprises a plurality of elementary streams associated with the video and audio portions of the transported audio-visual program.

A main transport demultiplexer 35 receives the first output stream SO1 from first switch 20. Main transport demultiplexer 35, in response to a control signal MAIN from the controller 70, extracts a particular program stream from the received system stream S01. Elementary video stream(s) V1 associated with the extracted program stream are coupled to a second switch 40. The elementary audio stream(s) A1 associated with the extracted program stream are coupled to an audio decoder 60. The audio decoder 60 decodes the elementary audio stream(s) and couples the decoded audio information to an audio driver circuit (not shown).

An auxiliary demux and processing unit 30 receives the second output stream SO2 from first switch 20. The auxiliary demux and processing unit 30, in response to a control signal AUX from the controller 70, operates in a picture-in-picture mode, a channel scanning mode or a channel changing mode. It should be noted that the circuitry (or software) used to implement a PIP processor is very similar to the circuitry (or software) used to provide the channel scanning and rapid channel acquisition functions of the invention. Therefore, the auxiliary demux and processing unit 30 will be described within the context of a PIP processing environment. However, the below-described PIP operations are not required to practice the invention.

In the PIP mode of operation, auxiliary demux and processing unit 30 receives a system stream SO2, demultiplexes a desired program stream from the received system stream S02, and retrieves a video elementary stream from the demultiplexed program stream. The retrieved video elementary stream is then coupled to the second switch 40 and, optionally, a format converter 50, as second video stream V2.

Second switch 40, in response to a control signal SW2 from the controller 70, selectively couples either the first V1 or second V2 elementary video stream to a video decoder 45, illustratively an MPEG video decoder, as video stream V3. Video decoder 45 decodes the selected video steam V3 in a known manner to produce a resultant video stream V4, illustratively a decoded (i.e., decompressed) video stream.

Format converter 50 receives the decoded video stream V4 and, optionally, the second elementary video stream V2. Format converter 50 includes a display frame buffer 55 and, optionally, an auxiliary video decoder 58. The format converter 50, in response to a control signal F from controller 70, operates in a "pass-through" mode of operation, a channel changing mode of operation of a PIP mode of operation to produce an output video stream VOUT. The output video stream VOUT is coupled to a video driver circuit (not shown) that processes the stream to produce an image on a display device (not shown).

In the "pass-through" mode of operation, format converter 50 couples the decoded video stream V4 to the video driver circuit as the output video stream VOUT. The display frame buffer 55 may be used to store, e.g., a single decoded frame. The stored single decoded frame, when coupled to the video driver and display, will result in a "frozen" image of the stored frame.

In the channel changing mode of operation, format converter 50 utilizes display frame buffer 55 to store a single video frame while the tuner/demodulator pair associated with the main transport demultiplexer 35 tunes and demodulates a new channel. The resulting video output signal VOUT represents a freeze-frame image of the stored frame. The single video frame is either the last frame of the old channel or, if the new channel is included in the scan list 150, a recent frame from the new channel. If the new channel is in the scan list then the recent frame is received from auxiliary demux and processing unit 30 directly via optional signal path V2, or via switch 40 and decoder 45 as decoded video stream V4. The channel changing mode of operation will be described in more detail below, with respect to FIG. 3.

In the PIP mode of operation, format converter 50 decodes, using optional auxiliary video decoder 58, at least a portion of the second elementary video stream V2 to produce a fully decoded or partially decoded auxiliary stream. The partially decoded auxiliary stream may comprise, e.g., only the video information included within the I-frames of the second elementary video stream V2. While such an auxiliary stream will produce a jerky image when displayed (since a typical ATSC stream includes one I-frame in each 12 frame GOP), this may be sufficient for a PIP application. Moreover, the complexity of the auxiliary video decoder 58 is greatly reduced if only I-frames need to be decoded. The full or partially decoded auxiliary stream is then reformatted using, e.g., a subsampling operation to reduce the amount of video information (i.e., reduce the size of a resulting image). The reformatted auxiliary stream is then merged with the decoded video stream V4 to produce the output stream VOUT. The displayed image resulting from the merged stream will comprise a main image associated with decoded video stream V4, and a size-reduced image associated with the reformatted auxiliary stream.

In the channel scanning mode of operation, auxiliary demux and processing unit 30 receives a system stream SO2, demultiplexes a desired program stream from the received system stream S02, and retrieves a video elementary stream from the demultiplexed program transport stream. The video elementary stream is then parsed to identify one or more I-frames within the video elementary stream. Each time an I-frame is identified, the identified I-frame is stored in a location in memory 34 associated with the particular program stream. Thus, the memory location is constantly overwritten with a new I-frame each time a new I-frame is identified. This process continues until the controller 70 causes the auxiliary demux and processing unit 30 to demultiplex a new video elementary stream from within, typically, a new program transport stream or to change the physical channel using the appropriate tuner. I-frames within the new video stream are identified in the above-described manner, and stored in a location in memory 34 associated with the new program transport stream. The change in streams is easily noted by, e.g., examining the packet identifications (PIDs) included in the headers of both transport and packetized elementary stream (PES) packets. The channel scanning mode of operation will be described in more detail below, with respect to FIG. 2.

In the channel changing mode of operation, auxiliary demux and processing unit 30 retrieves from memory 34, an couples to an output, the stored I-frame associated with a desired new main channel. The retrieved I-frame is coupled to video decoder 45 via second switch 40. The retrieved frame is identified by the controller 70 via the AUX signal. Optionally, the retrieved I-frame may be coupled directly to format converter 50 via optional path V2. The channel changing mode of operation will be described in more detail below, with respect to FIG. 3.

To conserve memory resources, auxiliary demux and processing unit 30 optionally includes a resize and compression unit 32. The resize and compression unit 32 resizes an I-frame prior to the storage of the I-frame. The resizing may be performed in the discrete cosine transfer (DCT) domain using the method described by Martucci in U.S. application Ser. No. 08/728,459, filed Oct. 10, 1996, U.S. Pat. No. 5,845,015, and incorporated herein by reference in its entirety. Alternatively, the frame (or frames) may be decoded and subsampled using only low-order DCT coefficients, then re-encoded and stored in the memory 34. In this manner the necessary size of memory 34 is advantageously reduced. Moreover, the need for auxiliary demux and processing unit 30 to use or control (i.e., coordinate with) the video decoder 45 or format converter 50 resources during the channel scanning or PIP operating modes is also reduced.

An exemplary scan list 150 is depicted in Table 1. Specifically, the scan list 150 depicted in Table 1 stores information necessary to retrieve each of 12 channels. This information includes a channel ID, tuner parameters, demodulator parameters, program transport stream PID, video elementary stream PID and audio elementary stream PID.

Two types of channel-related information are stored in the scan list, predetermined and variable. Predetermined channel-related information is that information derived from, e.g., a program associated table (PAT) or a program map table (PMT). For example, the nominal tuning frequency and the various transport, video and audio PIDs of a particular channel. Variable channel-related information is that information subject to change depending upon, e.g., signal propagation errors, thermal drift of components and other error sources. For example, associated with each tuner is a frequency drift correction parameter which is added to, or subtracted from, the nominal tuning frequency of a particular channel. In addition, coefficients for adaptive equalizers (not shown) within a tuner/demodulator pair are typically different for different channels.

It is important to note that by utilizing the predetermined and/or the variable channel-related information to retrieve a new channel in either a channel scanning operation or a channel changing operation, the actual time required to retrieve that channel is shortened. In a channel changing mode of operation, a previously-scanned desired new channel is associated with tuner and demodulator parameters that can be loaded directly into the main tuner/demodulator pair while a prior I-frame associated with the desired new channel is coupled to a display device. In this manner, the invention advantageously provides a means of both reducing and masking the channel change latency time.

The invention is also useful in changing to a new channel that is not on the scan list 150, if the new channel may be retrieved using tuner or demodulator parameters associated with a channel on the scan list 150. For example, if a new channel is within the same system stream as a scanned channel, then tuner and demodulator parameters associated with the scanned channel are directly applicable to the new channel. Moreover, some of the tuner and demodulator parameters relate to the actual hardware used to perform the tuning and demodulation functions. For example, frequency offsets and other error correction parameters within a tuner are likely to be similar for a large number of nominal carrier frequencies.

Referring to FIG. 1 an optional parameter memory 12 is depicted. The optional parameter memory may be used to store some or all of the items in the scan list 150. The optional parameter memory 12, in response to a control signal P from the controller 70, cooperates with both tuner/demodulator pairs (10A/15A and 10B/15B) to retrieve variable channel-related information. In addition, optional parameter memory 12 may be used to provide previously-retrieved variable channel-related information (i.e., information from the scan list 150) to the appropriate tuner/demodulator pair during either a channel scanning operation or a channel changing operation.

In the exemplary embodiment, there are 12 channels stored in the scan list 150 (there may, of course, be more or less channels stored in the scan list 150). The inventor has determined that these channels are the most likely channels to be selected next by a user. The first four channels included within the scan list 150 of the exemplary embodiment comprise the four most recently viewed channels. These are identified in Table 1 as recent, recent −1, recent −2, and recent −3.

The next four channels included within the scan list 150 of the exemplary embodiment are related to the presently-selected channel (i.e., the channel now being viewed). These are identified as the next, next +1, prior, and prior −1 channels. The next channel is simply the next channel a user would retrieve or select if the user was to increment a channel selection button on, e.g., a remote control device. The next +1 channel is the channel resulting from a second channel increment command. Similarly, the prior channel is a channel a user would select if a user were to decrement a channel selection button on, e.g., a remote control device. The prior −1 channel is the channel resulting from a second channel decrement command.

The final four channels included within the scan list 150 of the exemplary embodiment are simply four favorite channels. These channels may be preprogrammed by a user or may be statistically determined over time by, e.g., observing a user's channel selection habits. For example, controller 70 includes a memory portion 76 which may be used to store a counter associated with each of the channels available to a particular user. Upon power up, the controller 70 may examine the counter list, identify the four highest count values, and store information relating to the four channels associated with the four highest count values in the scan list.

TABLE 1

| Channel ID | Tuner Parameters | Demodulator Parameters | Transport PID | Video PID(s) | Audio PID(s) |
| --- | --- | --- | --- | --- | --- |
| Recent | | | | | |
| Recent −1 | | | | | |
| Recent −2 | | | | | |
| Recent −3 | | | | | |
| Next | | | | | |
| Next +1 | | | | | |
| Prior | | | | | |
| Prior −1 | | | | | |
| Favorite No. 1 | | | | | |
| Favorite No. 2 | | | | | |
| Favorite No. 3 | | | | | |
| Favorite No. 4 | | | | | |

Figure 2:
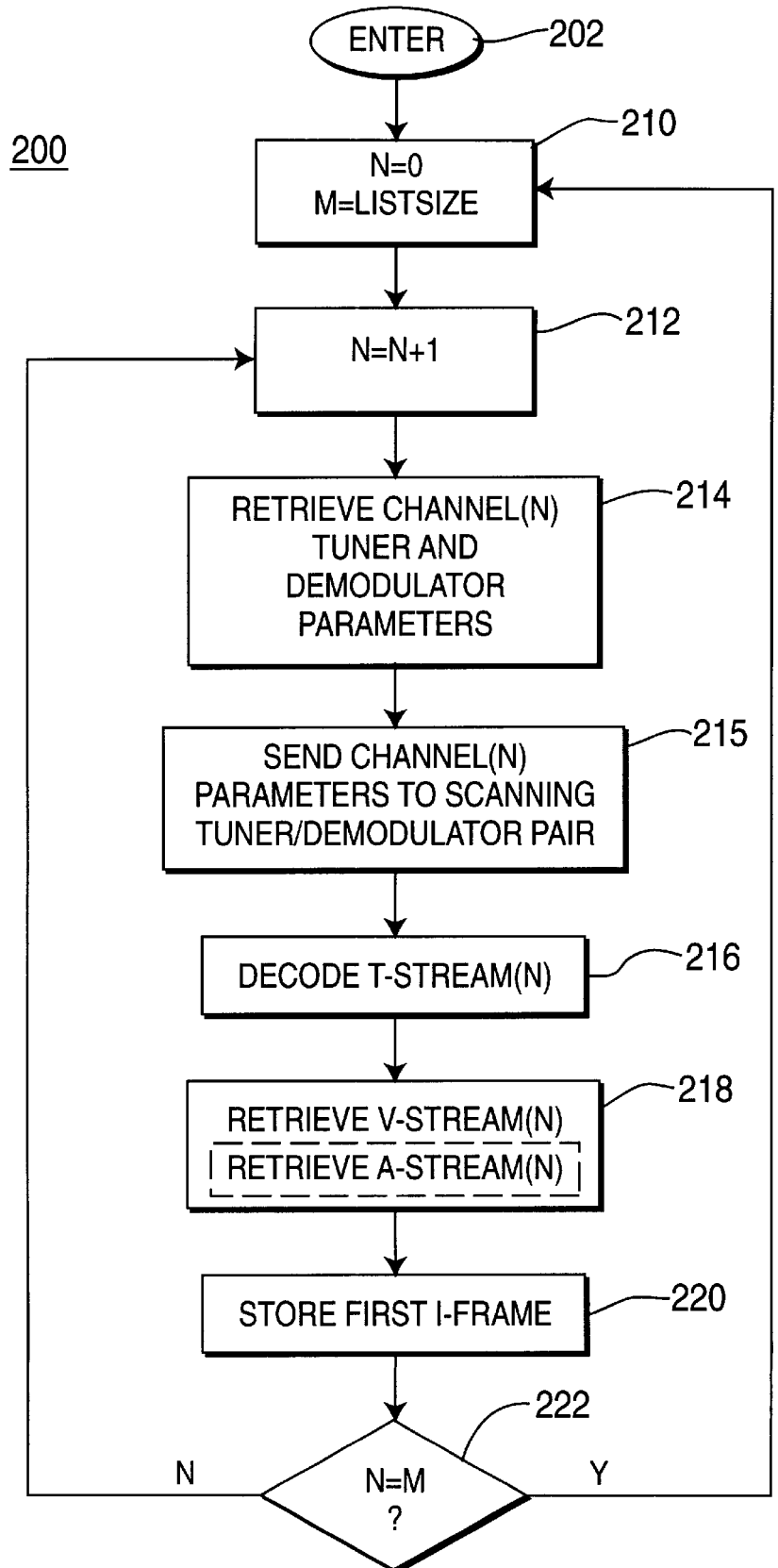
FIG. 2 depicts a flow diagram of a channel scanning routine according to the invention and suitable for use in the ATSC receiver of FIG. 1.

FIG. 2 depicts a flow diagram of a channel scanning routine 200 according to the invention and suitable for use in the ATSC receiver 100 of FIG. 1. Specifically, the channel scanning routine 200 is a portion of a system control routine (not shown) within controller 70 that controls various portions of the receiver 100. The channel scanning routine 200 operates as a "background," or "idle-state" routine. That is, the channel scanning routine 200 runs only when the system control routine in not active. For example, the system control routine may be in an idle state while waiting for a command from a user. Upon receiving a user command, the channel scanning routine 200 is terminated and a command servicing portion of the system controller routine is invoked. The channel scanning routine 200 utilizes information stored in a scan list 150 to retrieve at least an I-frame from the channels identified in the scan list. An exemplary scan list is depicted in Table 1.

The two tuner/demodulator pairs (10A/15A, 10B/15B) are both capable of functioning as either the main or auxiliary tuner/demodulator pairs due to the use of switch 20. Since one tuner/demodulator pair (i.e., the main tuner/demodulator pair) provides a system stream of a presently tuned channel to the main transport demultiplexer 35 (i.e., the presently tuned channel), controller 70 causes switch 20 to couple the output stream from the other tuner/demodulator pair (i.e., scanning tuner/demodulator pair) to the auxiliary demux and process unit 30.

The channel scanning routine 200 is entered at step 202, when the system control routine enters an idle state. The channel scanning routine 200 then proceeds to step 210, where an index variable N is initialized to zero, and a list size variable M is set equal to the number of channels stored in the scan list. In the exemplary embodiment, the scan list 150 comprises 12 channels as shown in Table 1 (i.e., four recent channels, four favorite channels and four channels proximately related to a currently selected channel). The index variable N is used to point to, and retrieve, information within the scan list pertaining to a particular (indexed) channel.

The channel scanning routine 200 proceeds from step 202 to step 212, where the index variable N is incremented by one. The routine 200 then proceeds to step 214, where the tuner parameters and demodulator parameters associated with the presently indexed channel are retrieved from the scan list 150. As previously noted, these parameters may also be stored in optional parameter memory 12. The routine then proceeds to step 215, where the retrieved parameters are coupled to the scanning tuner/demodulator pair (10A/15A or 10B/15B), which then begins to tune and demodulate the presently indexed channel.

The channel scanning routine 200 proceeds from step 215 to step 216, where, after some delay (i.e., carrier recovery, symbol recovery and the like), the auxiliary demux and processing unit 30 demultiplexes and decodes the program stream associated with the indexed channel from the received system stream (SO2). The routine then proceeds to step 218, where the elementary video stream and, optionally audio stream(s), associated with the indexed channel are retrieved from the program transport stream associated with the indexed channel. The routine then proceeds to step 220, where the first I frame encountered within the retrieved elementary video stream associated with the indexed channel is stored in memory unit 34. The routine then proceeds to step 222 where a query is made as to whether the index variable N is equal to the list size variable M. If the query at step 222 is answered negatively, then steps 212 through 222 are repeated (i.e., the next channel in the channel scan list is retrieved). If the query at step 222 is answered affirmatively, then steps 210 through 222 are repeated (i.e., the channel scan list is processed from the beginning).

The above-described channel scan routine 200 continually scans the channels stored in the scan list 150 to retrieve a recent I-frame for each channel and store the retrieved I-frame in a portion of memory 34 associated with that channel, thereby constructing an I-frame index of the scan list channels. In this manner, upon a determination that one of the scan list channels has been requested by a user, the stored I-frame associated with the requested channel can be immediately coupled to video decoder 45 to rapidly generate an image on the user's display screen. The rapid production of an image associated with the desired channel advantageously mimics the rapid (i.e., low latency) channel acquisition familiar to present-day consumers using NTSC television receivers.

Figure 3:
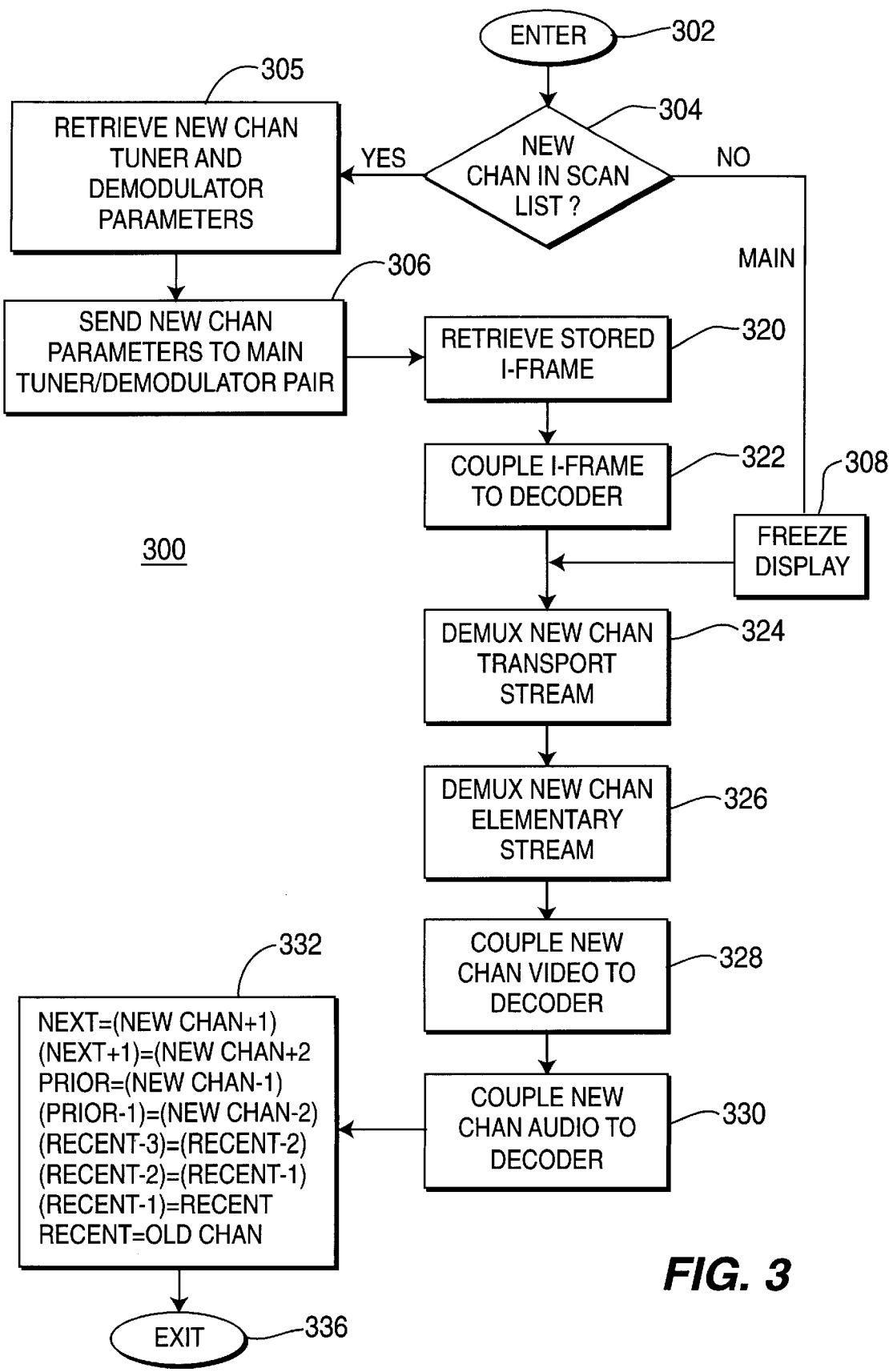
FIG. 3 depicts a flow diagram of a channel changing routine according to the invention and suitable for use in the ATSC receiver of FIG. 1.

FIG. 3 depicts a flow diagram of a channel changing routine 300 according to the invention and suitable for use in the ATSC receiver 100 of FIG. 1. Specifically, the channel changing routine 300 is a portion of the system control routine (not shown) within controller 70 that controls various portions of the receiver 100. The channel changing routine 300 is invoked in response to a user input indicative of a channel changing operation. The channel changing routine 300 will also cause the channel scanning routine 200 to terminate.

The channel changing routine 300 is entered at step 302, when a user input command indicative of a channel change operation is received by the controller 70. The routine 300 then proceeds to step 304, where a query is made as to whether the new channel is in the scan list.

If the query at step 304 is answered affirmatively, then the routine 300 proceeds to step 305, where the tuner and demodulator parameters associated with the new channel are retrieved from the scan list. The routine 300 then proceeds to step 306, where the retrieved tuner and demodulator parameters are coupled to the main tuner/demodulator pair (i.e., of the tuner/demodulator pair used to produce system stream SO1). This causes the main tuner/demodulator pair to begin the process of producing a valid system stream including the channel of interest (i.e., the new channel). The routine then proceeds to step 320, where the controller 70 causes the auxiliary demux and processing unit 30 to retrieve from memory 34 the I-frame associated with the desired new channel. The routine 300 then proceeds to step 322, where the retrieved I-frame is coupled to decoder 45 via switch 40. Decoder 45 will decode the I-frame and couple it to format converter 50, where the I-frame will be stored in display frame buffer 55. The frame buffer-stored I-frame will produce a still image on the display device (not shown). If necessary (i.e., if the retrieved I-frame was processed by optional resize and compress unit 32), format converter 50 will convert the retrieved I-frame to a format suitable for use by the video driver and display. The routine 300 then proceeds to step 324.

If the query at step 304 is answered negatively, i.e., the desired new channel does not correspond to any of the channels presently indexed in the scan list, the routine 300 proceeds to step 308. At step 308, the frame present is the display frame buffer 55 of format converter 50 is used to provide a still image (i.e., the presently-displayed or "old" channel is simply frozen on the screen). The routine 300 then proceeds to step 324.

At step 324 the controller 70 causes the main transport demultiplexer 35 to demultiplex the program transport stream associated with the desired new channel from the system stream SO1 produced by the main tuner/demodulator pair (identified at step 304). The routine then proceeds to step 326, where the elementary streams associated with the desired new channel are retrieved form the transport program stream. The routine then proceeds to step 328, where the video elementary stream associated with the new channel is coupled to decoder 45 via switch 40. The routine 300 then proceeds to step 330, where the audio elementary stream(s) associated with the desired new channel is coupled to audio decoder 60.

After the elementary video (step 328) and elementary audio (step 330) streams have been coupled to respective video (45) and audio (60) decoders, the routine 300 proceeds to step 332. At step 332, the scan list is updated to reflect the new channel information. Specifically, information identifying the channel ID, tuner frequency, program transport stream PID, video elementary stream PID and audio elementary stream PID is updated for the "recent," "next" and "prior" channels as follows. The "recent−3" information is discarded, the "recent−2" information is stored in the "recent−3" location, the "recent−1" information is stored in the "recent−2" location, the "recent" information is stored in the "recent−1" location and information relating to the "old" or "previously-tuned" channel is stored in the "recent" storage locations. Additionally, information relating to the two channels incrementally above the new channel (i.e., "next" and "next+1") and information relating to the two channels incrementally below the new channel (i.e., "prior" and "prior−1") are stored in the scan list 150. The routine 300 then proceeds to step 336, where it is exited.

An additional feature of the invention is a PIP "swap" mode of operation. As previously described, first switch 20, in response to a control signal SW1 from the controller 70, couples one of the first and second system streams SA, SB to a first output O1 as a first output stream SO1, and one of the first and second system streams SA, SB to a second output O2 as a second output stream SO2. In the PIP mode of operation, the system stream coupled to first output O1 is utilized by the main transport demultiplexer 35, and related circuitry, to produce a video signal V4 used to generate a main image on a display. Similarly, the system stream coupled to second output O2 is utilized by the auxiliary demux and processing unit 30, and related circuitry, to produce a video signal V2 used to generate an auxiliary (i.e., PIP) image. In the PIP swap mode of operation, first switch 20, in response to a control signal SW1 from the controller 70, swaps the system streams coupled to outputs O1 and O2. That is, the system stream coupled to output O1 prior to entering the PIP swap mode is coupled to output O2 upon entering the PIP swap mode. Similarly, the system stream coupled to output O2 prior to entering the PIP swap mode is coupled to output O1 upon entering the PIP swap mode. The on-screen effect is a swapping of the main and PIP images. The PIP swap operation is very fast, because the system streams swapped by first switch 20 are already available (i.e., there is no tuning or demodulation delay).

An additional feature of the invention is the ability to produce a scanning channel "mosaic" or image tile. Specifically, the auxiliary demux and processing unit 30 utilize optional resize and compression unit 32 to compress each I-frame such that a compressed I-frame, when displayed, will occupy, e.g., ¹/₁₂th of an image. In this manner, all 12 channels in the scan list 150 may be displayed together in a multiple PIP, or image-tile arrangement. The image-tile may be updated each time an individually stored I-frame is updated. Such an image-tile arrangement may contain four, nine, 12, 16 or some other convenient number of images. Known on-screen selection methods may be used to select a particular "tile" for viewing as a full size (i.e., main) image.

Figure 4:
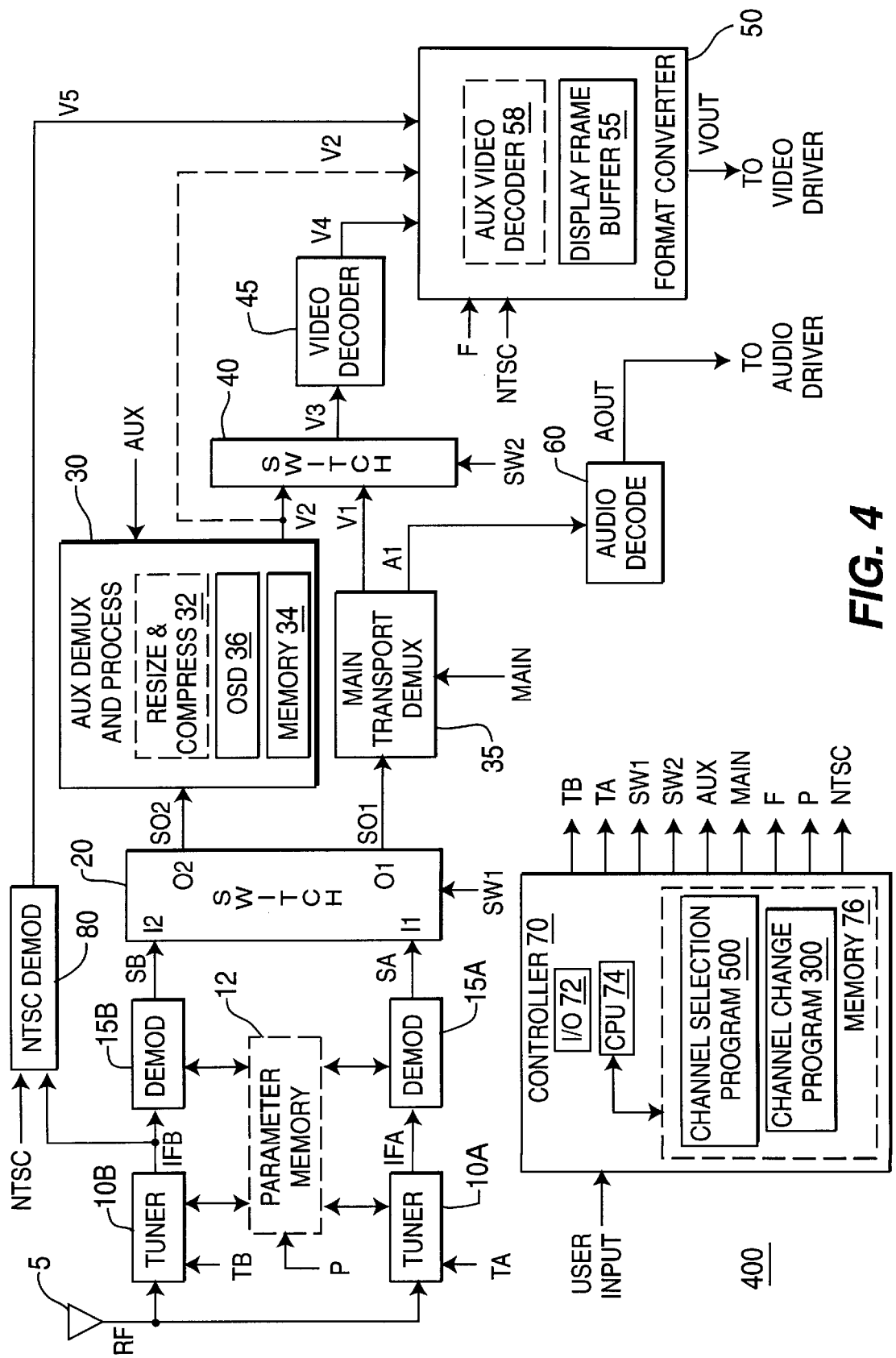
FIG. 4 depicts a high-level block diagram of a television receiver 400 according to the invention.

FIG. 4 depicts a high-level block diagram of a television receiver 400 according to the invention. The television receiver 400 comprises a digital television receiver portion, illustratively an ATSC portion, and an analog television receiver portion, illustratively an NTSC portion. Both the digital television portion and the analog television portion are controlled by the controller 70. Since the functional elements common to FIGS. 1 and 4 operate in substantially the same manner, only the differences in operation and/or connections between the common functional elements will be described in more detail.

Specifically, the television receiver 400 comprises the ATSC receiver 100 of FIG. 1 modified to include an analog television demodulator 80, illustratively an NTSC demodulator, and an on screen display (OSD) generator 36. The NTSC demodulator 80, in response to a control signal NTSC produced by the controller 70, demodulates an NTSC encoded intermediate frequency television signal to produce a digital video signal V5. While the OSD generator 36 is depicted as a part of the auxiliary demux and processing unit 30, those skilled in the art will readily understand that the OSD generator may be incorporated into the television receiver 400 of FIG. 4 (or the television receiver 100 of FIG. 1) using any one of a number of standard techniques. Moreover, those skilled in the art will readily understand that the analog television demodulator 80 may be an NTSC demodulator, a PAL demodulator or a SECAM demodulator.

The controller 70 includes a channel selection program 500 stored within the memory unit 76. The channel selection program 500 will be described in more detail below with respect to FIG. 5. Briefly, the channel selection program processes each received digit indicative of a channel selection presently being made by a user via a remote control device. In response to a digit indicative of the selection of a particular class of channel (e.g., NTSC, tuned ATSC, untuned ATSC and the like), tuning, demodulation and/or demultiplexing operations associated with that class of channel are invoked in a manner designed to speed up the process of selecting a particular channel within the indicated class of channels.

The digital video signal V5 produced by the NTSC demodulator 80 is coupled to the format converter 50. As previously noted, the format converter 50, in response to the control signal F from controller 70, operates in a "pass-through" mode of operation, a channel changing mode of operation and a PIP mode of operation to produce an output video stream VOUT. In addition, format converter 50, in response to the control signal F from controller 70, operates in an "NTSC pass through" mode of operation. In the NTSC pass through mode, format converter 50 converts the NTSC raster to the native display format of the display device (e.g., 1080 lines by 1920 pixels). The converted video signal is then coupled to the video driver circuit as the output video stream VOUT.

The display frame buffer 55 of the format converter 50 is used to store each video frame within the digital video signal V5 prior to transmission of the stored frame to the video driver circuit. Thus, the previously described channel changing latency masking techniques may be used when changing from one NTSC channel to another, from an NTSC channel to an ATSC channel and from an ATSC channel to an NTSC channel.

It must be noted that while the NTSC demodulator 80 is depicted within the context of the dual tuner/demodulator digital television system of FIG. 1, the method for selecting channels described below with respect to FIG. 5 may be practiced using only a single tuner/demodulator television system. Such a single tuner/demodulator television system may avoid several of the functional blocks depicted in the dual tuner/demodulator television system of FIG. 1. Specifically, in a single tuner/demodulator television system there is no requirement to include the first tuner 10A, first demodulator 15A and first switch 20. Moreover, the main transport demux unit 35 and second switch 40 may be removed if the auxiliary demux and processing unit 30 is modified to coupled its output video stream V2 directly to the video decoder 45, demultiplex audio streams and couple the demultiplexed audio streams to the audio decoder 60.

Figure 5:
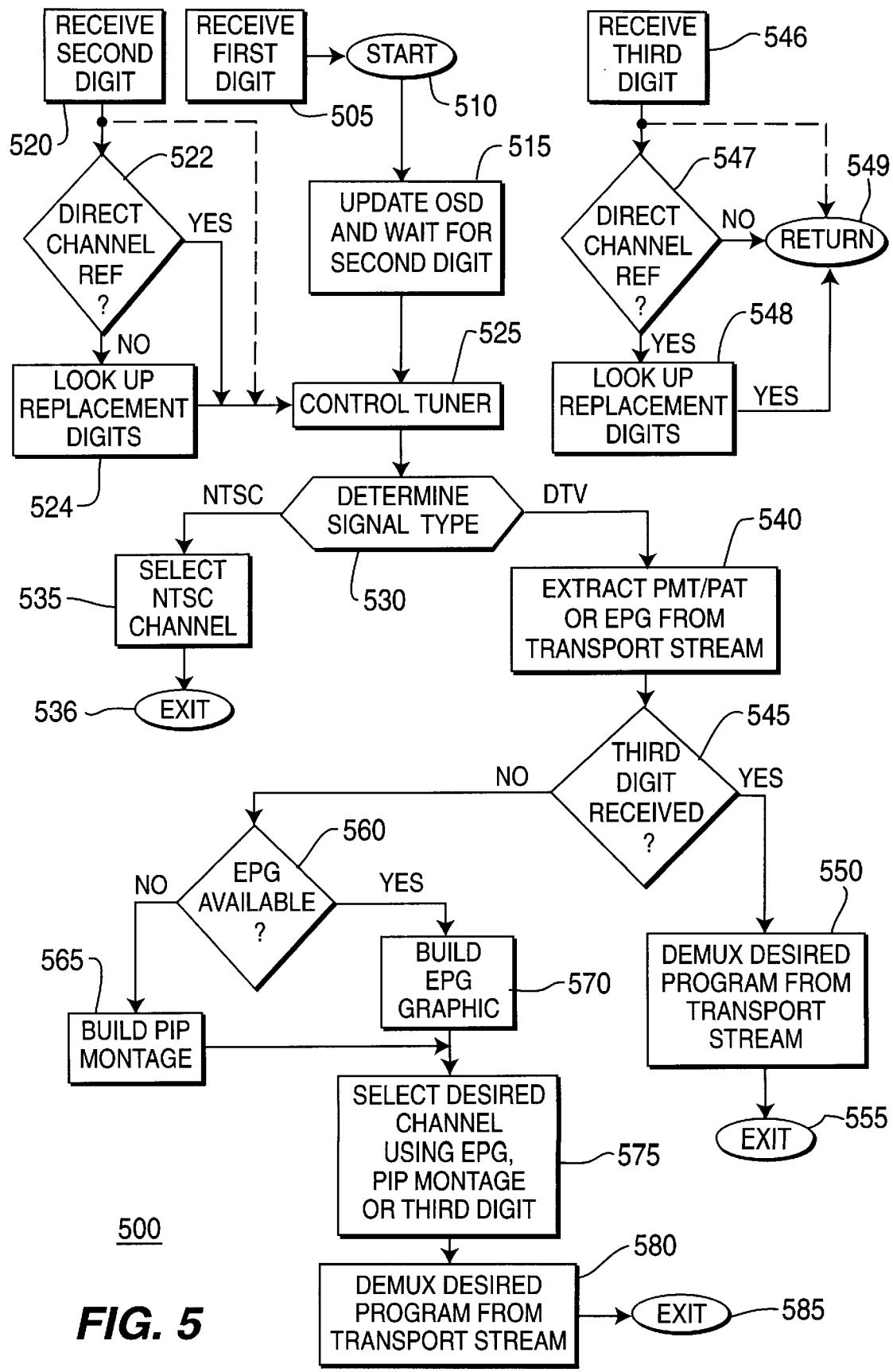
FIG. 5 depicts a flow diagram of a channel selection routine according to the invention and suitable for use in the television receivers of FIG. 1 and FIG. 4.

FIG. 5 depicts a flow diagram of a channel selection routine 500 according to the invention and suitable for use in the ATSC receivers of FIG. 1 and FIG. 4. The channel selection routine 500 is used to rapidly identify, based on the input of a user, a new channel to be selected. That is, in response to a digit indicative of the selection of a particular class of channel (e.g., NTSC, presently tuned ATSC, untuned ATSC and the like), tuning, demodulation and/or demultiplexing operations associated with that class of channel are invoked in a manner designed to speed up the process of selecting a particular channel within the indicated class of channels. The channel selection routine 500 is stored in, illustratively, the memory 76 of the controller 70 of the television receiver 400 of FIG. 4. It must be noted that the channel selection 500 may be advantageously utilized by the ATSC receiver 100 of FIG. 1, since the routine 500 includes selection methodology suitable for use in a non-NTSC environment.

The controller 70 is responsive to user input commands, including channel selection commands such as "channel increment," "channel decrement," "previous channel" and the direct numeric entry of a particular channel number. In the case of the direct numeric entry of a particular channel number, illustratively a three digit channel number, the channel selection routine 500 operates to adapt various tuner, demodulator and/or bitstream extraction parameters during the period of time that a user is selecting a channel (e.g., pressing buttons on a remote control device).

The channel selection routine 500 is entered at step 510, when, e.g., controller 70 receives a user input comprising the first digit of a channel identifier (indicated by step 505). The routine 500 then proceeds to step 515, where an on-screen display is updated to indicate, e.g., the digit received by the controller 70. The routine waits for a second digit to be received by the controller 70.

Upon receipt of the second digit (indicated by step 520), the routine 500 proceeds to step 522, where a query is made at to whether the channel reference indicated by the first and second channel digits comprises a direct channel reference or an indirect channel reference.

A direct channel reference is a channel directly identified by the first and second digits. For example, if a user presses a "1" and then a "2" the direct channel is channel "12." However, in the future there may be instances where, due to government spectral allocation requirements, the channel previously known as channel "12" has been remapped (either physically or logically) to, e.g., channel "57." This remapping will likely be transparent to the user, since the television station owners will want to preserve the brand identity or good will built up around channel "12." Therefore, television manufacturers will likely include a fixed or programmable channel remapping function within a television set. The remapping function may be implemented in a standard manner using, e.g., a lookup table. The lookup table may be updated in a standard manner using, e.g., electronic program guide information and other information contained within the received information streams (e.g., program allocation table and program map table information). Additionally, such information may be obtained using techniques described in the ATSC draft standard T3/S8 entitled "Program and System Information Protocol for Terrestrial Broadcast and Cable," also known as PSIP, which is incorporated herein by reference in its entirety.

If the query at step 522 is answered affirmatively, then the routine 500 proceeds to step 525, where the controller 70 causes a physical channel selector, such as second tuner 10B, to tune a physical channel having a signal frequency associated with the two received digits. That is, since the first two digits of a three-digit channel identification number are indicative of a physical channel, the controller 70 causes the tuner 10B to tune the physical channel associated with the two received digits. The routine 500 then proceeds to step 530, where a query is made as to the type of signal received on the tuned frequency.

If the query at step 522 is answered negatively, then the routine 500 proceeds to step 524, where the received first and second digits (representing an indirect channel reference) are remapped to a direct channel reference. The routine 500 then proceeds to step 525, where the controller 70 causes a physical channel selector, such as second tuner 10B, to tune a physical channel having a signal frequency associated with the two received digits. That is, since the first two digits of a three-digit channel identification number are indicative of a physical channel, the controller 70 causes the tuner 10B to tune the physical channel associated with the two replacement digits (i.e., the remapped channel). The routine 500 then proceeds to step 530, where a query is made as to the type of signal received on the tuned frequency.

It should be noted that steps 522 and 524 may be optionally bypassed in a bypass mode of operation, as indicated by the dashed line connected step 520 to step 525 in FIG. 5. In the case of the bypass mode of operation, only the direct channel reference may be used to identify a desired channel. Thus, in the above example of a remapping of channel "12" to channel "57," the user must enter a "5" and a "7" to select the channel previously known as channel "12."

Steps 546 through 549 indicate a subroutine used to handle receipt of a third digit. Specifically, the subroutine 546–549 is entered at step 546 when, e.g., controller 70 receives a user input comprising a third digit of a channel identifier. The routine 500 proceeds to step 547, where a query is made at to whether the channel reference indicated by the third channel digit comprises a direct channel reference or an indirect channel reference. Alternatively, the result of the query at step 522 may be referred to. It should be noted that steps 547 and 548 may be optionally bypassed in a bypass mode of operation, as indicated by the dashed line connected step 546 to step 549 in FIG. 5.

If the query at step 547 is answered negatively, then the routine 500 proceeds to step 548, where the received third digit (representing an indirect channel reference) is remapped to a direct channel reference. The routine 500 then proceeds to step 549, where the subroutine 546–549 is exited. If the query at step 547 is answered affirmatively, then the routine 500 proceeds to step 549, where the subroutine 546–549 is exited.

If the query at step 530 indicates that the received signal is an NTSC television signal, then the routine 500 proceeds to step 535, where the tuned NTSC signal is demodulated and displayed in the standard manner. The routine then exits at step 536.

If the query at step 530 indicates that the tuned frequency comprises a DTV (or ATSC) signal, then the routine 500 proceeds to step 540, where data representative of an electronic program guide (EPG) is extracted from the transport stream in a standard manner by, e.g., the auxiliary demux and processing unit 30. If the demodulated transport stream does not include a readily available electronic program guide (e.g., the EPG data is included in a different transport stream of either the presently tuned physical channel or a presently non-tuned physical channel) or cannot be retrieved from memory (e.g., the EPG data has not been previously loaded into an EPG portion of memory), then auxiliary demux and processing unit 30 extracts a program map table (PMT) and/or program association table (PAT) from the demodulated transport stream in a standard manner.

It should be noted that in the case of dual tuner/demodulator pairs, one of the tuners may be employed to scan physical and logical channels to retrieve data appropriate to either an EPG or to a montage. That is, EPG related data may be retrieved by one tuner/demodulator pair, while the other tuner/demodulator pair is retrieving data suitable for use in constructing a PIP montage. Similarly, both tuner/demodulator pairs may be employed at the same time to rapidly retrieve the data necessary to construct, e.g., a PIP montage.

The routine then proceeds to step 545, where a query is made as to whether a third digit has been received. If the query at step 545 is answered affirmatively, then the routine 500 proceeds to step 550, where desired program stream demultiplexed from the demodulated transport stream, processed and displayed. The routine 500 then exits at step 555.

If the query at step 545 is answered negatively, then the routine 500 proceeds to step 560, where a query is made as to whether an electronic program guide (EPG) is available in either the readily available demodulated transport stream or in memory. If the query at step 560 is answered affirmatively, then the routine 500 proceeds to step 570, where an EPG graphic is built in a standard manner using the extracted or stored EPG information from step 540. The EPG graphic is built by, illustratively, the on screen display (OSD) generator 36. The routine 500 then proceeds to step 575, where the user selects a program by manipulating, using arrow keys and the answer key on a remote control device, the electronic program guide in a standard manner. At any time during this manipulation of the electronic programming guide, the user may enter a third digit related to the first two digits of a three-digit channel identification number. If such a third digit is entered by the user, the routine 500 proceeds to step 580, where the desired program is demultiplexed from the demodulated transport stream.

The electronic program guide generated at steps 570 and 575 may comprise one of a full electronic program guide or physical channel specific electronic program guide. A full electronic program guide comprises a standard electronic program guide indicating which program is available at what time and on what physical and logical channel. A channel specific program guide comprises a listing of what program is available at what time and on what logical channel within the physical channel previously selected by the first two digits of the user's input.

In one embodiment of the invention the electronic program guide generated at steps 570 and 575 includes image information relating to one or more of the channels included within the EPG. The image information may be derived from the channel scanning routine 200 previously described with respect to FIG. 2, which provided image information (e.g., an I-Frame) associated with each of a plurality of available channels. In the case of a single tuner/demodulator system, the image information is derived by scanning the logical channels associated with the presently tuned and demodulated physical channel. In the case of a multiple tuner/demodulator system (e.g., FIG. 1), the image information is additionally derived by utilizing an additional tuner/demodulator pair to scan other physical and/or logical channels. That is, an unused tuner/demodulator pair is employed to select, in a background mode of operation, other physical channels while image information from the logical channels associated with the other physical channels is stored in memory.

The additional image information retrieved by the above-described techniques, other techniques described in this disclosure and standard techniques known to those skilled in the art is advantageously utilized within the EPG to provide an enhanced function EPG. The enhanced function EPG provides the standard selection information of an EPG along with any available supplemental image information associated with the channels. In this manner, a user is given more information to help make a channel selection decision.

An exemplary EPG graphic is described below with respect to FIG. 6B. Briefly, the exemplary EPG graphic is utilized to provide on-screen information that a user may manipulate, via remote control, to scroll through a number of available program/time slot combinations and select a desired program. It should be noted that a typical electronic program guide manipulation and selection process comprises the steps of manipulating, via up, down, left and right arrow keys, a highlighted object or other identifier of a program displayed within a graphic indicative of both channel number and time slot for the respective program. A particular program is selected by highlighting that program and subsequently pressing, e.g., an enter key.

If the query at step 560 is answered negatively, then the routine 500 proceeds to step 565, where auxiliary demux and processing unit 30 is used to build a picture-in-picture (PIP) montage indicative of some or all of the logical channels available on the selected physical channel. Specifically, in a case of a physical channel carrying, e.g., nine logical channels, auxiliary demux and processing unit builds 3×3 grid of sub-images within a single video frame, as discussed below with respect to FIG. 6A. A particular program is selected by highlighting the sub-image associated with that program (e.g., by manipulating up, down, left and right keys) and subsequently pressing, e.g., an enter key. The routine then proceeds to step 580, where the desired program is demultiplexed from the demodulated transport stream. The routine 500 then exits at step 585.

It should be noted in the case of the invention operating in a non-bypass mode and the first and second digits representing an indirect channel reference (steps 522–524), a received third digit will also be remapped by the controller.

Figure 6A:
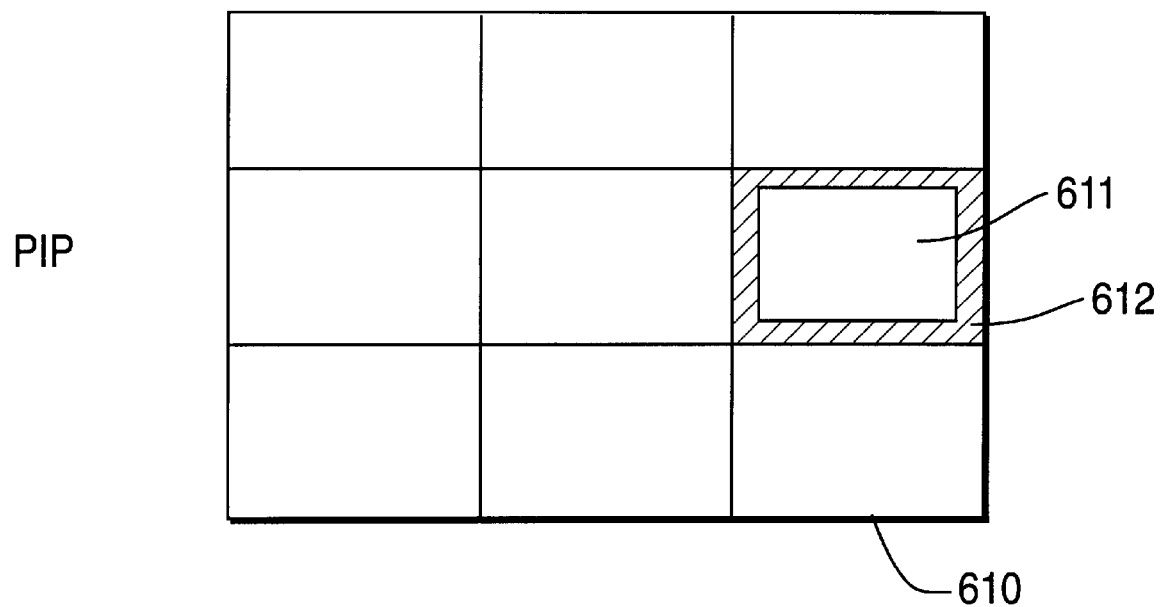
FIG. 6A depicts an on-screen picture-in-picture (PIP) montage suitable for use in the present invention.

FIG. 6A depicts an on-screen picture-in-picture (PIP) montage 610 suitable for use in the present invention. Specifically, FIG. 6A depicts a plurality of sub-images arranged in a grid. Each of the sub-images comprises a static or dynamic image associated with a respective video stream received via a respective physical or virtual channel. The video stream may be one of several video streams within, e.g., a particular transport stream. The particular transport stream may be one of several transport streams within a particular system stream received by, e.g., the tuner 10B (or 10A) of FIG. 1 or FIG. 4.

In the PIP montage 610 of FIG. 6A, a sub-image denoted as 611 is highlighted by, illustratively, an on-screen graphic denoted as 612. The on-screen graphic is formed in a standard manner using an on screen display (OSD) generator 36.

Each sub-image is formed by tuning a respective physical or virtual channel, demultiplexing a video program within the tuned channel, extracting a video frame from the demultiplexed video stream (e.g., an I-frame), decimating the extracted frame to produce a lower resolution video frame, and incorporating the lower resolution video frame as a sub-image within a standard resolution video frame coupled to the video processing circuitry. The highlighting region 612 is produced by, illustratively, on-screen display (OSD) circuitry located within the auxiliary demux and processing unit 30. The PIP highlighting region 612 is moved from sub-image to sub-image by a user manipulating controls on, e.g., a remote control unit. Illustratively, the highlighted region 612 is moved vertically in response to up or down arrow key activations, and moved horizontally by left and right arrow key activations. The presently-highlighted sub-image may comprise a still image or a moving image. That is, the sub-image highlighted by the highlighting region 612 (i.e., sub-image 611) may comprise a decimated full motion video image. When a particular highlighted region is selected for viewing by activation of an enter key on a remote control device, the pit montage is removed, the selected video stream associated with the selected sub-image is coupled to the video processing circuitry as a main image.

In one embodiment of the invention, each non-highlighted sub-image within the PIP montage 610 comprises a static image that is updated at a regular interval, e.g., every few seconds. In this embodiment, the highlighted sub-image (e.g., sub-image 611) comprises a dynamic image. That is, the highlighted sub-image comprises a substantially full motion video image. Optionally, the audio track associated with the highlighted image is decoded and coupled to the audio processor (not shown) so that the user is able to see and hear the audio-visual program represented by the highlighted sub-image.

Figure 6B:
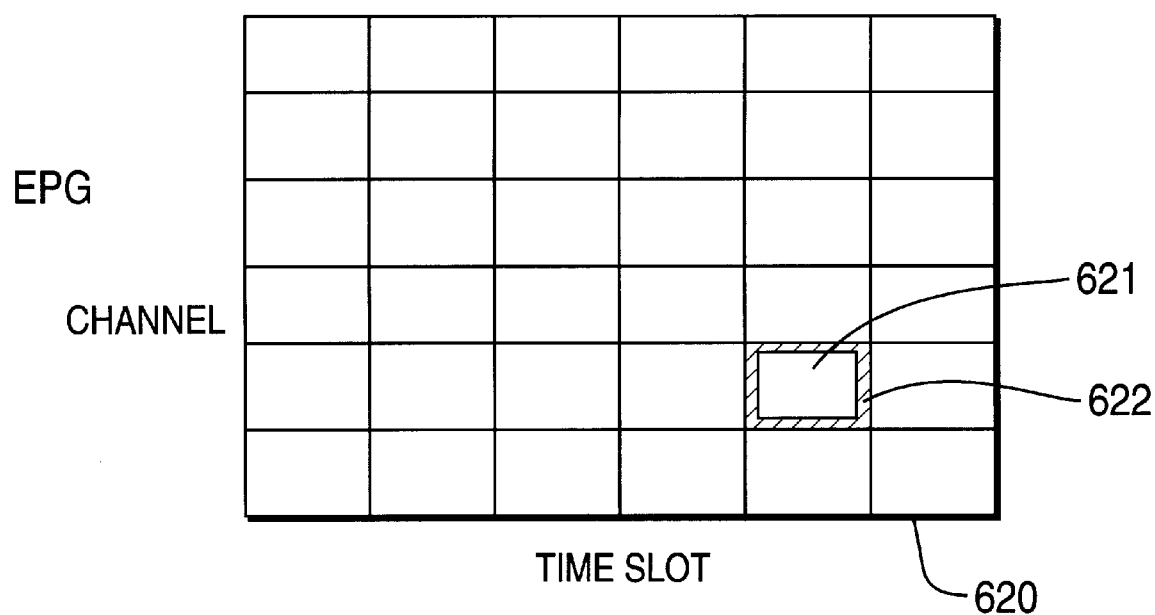
FIG. 6B depicts an electronic programming guide (EPG) on-screen display suitable for use in the present invention.

FIG. 6B depicts an electronic programming guide (EPG) on-screen display 620. Typical EPGs comprise a grid depicting physical and/or virtual channels as a function of time slots, where each grid entry denotes a particular program transmitted by a particular channel within a particular time period. In the case of an enhanced EPG, grid coordinates associated with channel having image information stored in memory additionally include some or all of the stored image information. For example, the stored information may require decimation prior to display. In this manner, standard ergonomic issues are addressed such that a user is provided with a suitable image.

The EPG 620 of FIG. 6B shows a particular program guide entry 621 bounded by an on screen display highlighting 622. As with the PIP montage 610 depicted in FIG. 6A, the EPG 620 depicted in FIG. 6B is manipulated by a user via a remote control device such that the highlighted region 622 is moved up, down, left and right in response to arrow or other keys on a remote control device. If a highlighted program is selected for viewing by, e.g., activation of an enter key on the remote control device, and if the selected program is presently being transmitted, then the selected program will be demultiplexed, decoded and coupled to the video processing circuitry for a display. Additionally, the audio program associated with the selected video program will be coupled to the audio processing circuitry.

In one embodiment of the invention, a presently highlighted EPG grid coordinate is expanded to show any available image information related to the associated channel.

Thus, in response to a partial indicium (e.g., two digits of a three digit channel identifier) of a desired television channel selection, the controller 70 causes a physical channel selection apparatus (e.g., tuner 10B) to select a particular physical channel. If the selected physical channel yields an analog television channel, such as an NTSC, PAL or SECAM channel, then the selected physical channel is demodulated by the analog television demodulator 80 and coupled to the format converter 50 for processing prior to, e.g., display. If the selected physical channel yields a digital television channel, such as an ATSC or DTB channel, then the selected physical channel is processed to extract program guide information. If the selected physical channel does not include program guide information, then the virtual channel (s) within the selected physical channel are identified and used to build a PIP montage. A user then manipulates the program guide or PIP montage in such a manner as to effect a channel selection. Alternatively, the user may provide remainder indicium of a desired television channel selection (e.g., a third digit of a three digit channel identifier) to directly select the desired channel.

Although various embodiments which incorporate the teachings of the present invention have been shown and described in detail herein, those skilled in the art can readily devise many other varied embodiments that still incorporate these teachings.

What is claimed is:

1. In a television receiver, a method for selecting for further processing one of a plurality of available television channels comprising the steps of:

adapting, in response to a user input indicative of at least a desired physical channel, a physical channel selection apparatus; and in the case of said physical channel selection apparatus providing a first type of television channel:

selecting said television channel provided by said physical channel selection apparatus;

in the case of said physical channel selection apparatus providing a second type of television channel:

providing, to said user, channel selection information comprising at least one of electronic program guide information and image information associated with one or more logical channels; and selecting, in response to a user input indicative of a desired logical channel, said desired logical channel.

2. The method of claim 1, wherein, in the case of said physical channel selection apparatus of said television receiver being capable of selecting only a single physical channel at one time, said method further comprises the step of:

storing, in a scanning mode of operation, image information from one or more logical channels associated with a presently selected physical channel.

3. The method of claim 2, wherein:

said first type of television channel comprises one of an NTSC, PAL and SECAM television channel; and said second type of television channel comprises an MPEG-like television channel.

4. The method of claim 1, wherein, in the case of said physical channel selection apparatus of said television receiver being capable of selecting a plurality of physical channels at one time, said method further comprises the step of:

storing, in a scanning mode of operation, image information from one or more logical channels associated with each of a plurality of presently selected physical channels.

5. The method of claim 4, further comprising the step of:

selecting, using at least one of a plurality of physical channel selection apparatus, each of a plurality of physical channels for a period of time sufficient to perform said step of storing.

6. The method of claim 5, further comprising the step of:

retrieving, in said scanning mode of operation, data associated with said electronic program guide.

7. The method of claim 1, wherein:

said electronic program guide information is provided to said user as a graphical display including, for each logical channel, program content information and program time information, said user interactively navigating said electronic program guide and selecting a desired logical channel using an input device.

8. The method of claim 7, wherein:

said electronic program guide information additionally includes available image information for each logical channel included in said electronic program guide.

9. The method of claim 8, wherein:

said user interaction results in a highlighting of a portion of said electronic program guide associated with one logical channel and, in the case of said one logical channel being associated with available image information, a presentation of said image information in relatively large display format.

10. The method of claim 7, wherein:

said user interaction results in a highlighting of a portion of said electronic program guide associated with one logical channel.

11. The method of claim 1, wherein:

said image information comprises a plurality of images associated with respective logical channels, said user interactively navigating and selecting one of said plurality of images, said logical channel associated with said selected one of said plurality of images being selected for further processing.

12. The method of claim 1, wherein:

said first type of television channel comprises one of an NTSC, PAL and SECAM television channel; and said second type of television channel comprises an MPEG-like television channel.

13. In a television receiver, a method for selecting one of a plurality of available television channels comprising the steps of:

adapting, in response to a partial indicium of a desired television channel, a physical channel selection apparatus; and in the case of said physical channel selection apparatus providing a first type of television channel:
selecting said television channel provided by said physical channel selection apparatus;

in the case of said physical channel apparatus providing a second type of television channel:
generating, in the case of an electronic program guide database being available, a first information signal including channel identification information according to said electronic program guide database; and
selecting, in response to a remainder indicium of said desired television channel, a television channel associated with said partial indicium and said remainder indicium.

14. The method of claim 13, wherein in the case of said physical channel apparatus providing a second type of television channel said method further comprises the steps of:

generating, in the case of an electronic program guide database not being available, a second information signal including image information of each of a plurality of television channels.

15. The method of claim 13, wherein said partial indicium of a desired television channel comprises information sufficient to identify a physical channel portion of said desired television channel; and said remainder indicium of said desired television channel comprises information sufficient to identify a logical channel portion of said desired television channel.

16. The method of claim 13, further comprising the steps of:

scanning, in a background mode of operation prior to receiving said partial channel indicium, one or more physical channels and logical channels associated with said one or more physical channels;

building, in said background mode of operation, an image database comprising a single image associated with at least each respective scanned logical channel; and in the case of said partial channel indicium resulting in said physical channel apparatus providing said second type of television channel:

generating, in a non-background mode of operation and in the case of an electronic program guide database not being available, a second information signal including image information of each of a plurality of television channels.

17. The method of claim 13, further comprising the steps of:

determining if said partial indicium of said desired television channel is associated with an indirect television channel indicium; and remapping said partial indicium of said desired television channel to correspond to a direct indicium of said desired television channel.

18. The method of claim 13, wherein:

said first type of television channel comprises one of an NTSC, PAL and SECAM television channel; and said second type of television channel comprises an MPEG-like television channel.

19. A method for selecting a television channel within a television system defining television channels according to a physical channel parameter and a logical channel parameter, said method comprising the steps of:

adapting, upon receiving a physical channel parameter associated with a desired television channel, a physical channel selection apparatus; and in the case of said physical channel selection apparatus providing a first type of television channel:
selecting said television channel provided by said physical channel selection apparatus;

in the case of said physical channel selection apparatus providing a second type of television channel:
providing, in the case of an electronic program guide database being available, electronic program guide information representative of at least one of those logical channels associated with said physical channel parameter; and
selecting, in response to a logical channel parameter associated with said desired television channel, said desired television channel.

20. The method for selecting a television channel according to claim 19, wherein:

in the case of said physical channel selection apparatus providing a second type of television channel, said method further comprises the step of:
providing, in the case of an electronic program guide database not being available, image information representative of at least one of those logical channels associated with said physical channel parameter.

* * * * *